US008083595B2

(12) United States Patent
Sanchez et al.

(10) Patent No.: US 8,083,595 B2
(45) Date of Patent: Dec. 27, 2011

(54) PROPSHAFT ASSEMBLY WITH CENTER BEARING SHIELD

(75) Inventors: Victor S. Sanchez, Belleville, MI (US); Jacek J. Jankowski, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 309 days.

(21) Appl. No.: 12/464,261

(22) Filed: May 12, 2009

(65) Prior Publication Data

US 2010/0292015 A1 Nov. 18, 2010

(51) Int. Cl.
*F16D 3/84* (2006.01)
(52) U.S. Cl. .......................................... 464/17; 464/178
(58) Field of Classification Search .................... 464/17, 464/170, 173, 178, 179, 182; 384/478, 536, 384/582; 74/609
See application file for complete search history.

(56) References Cited

U.S. PATENT DOCUMENTS

| | | | |
|---|---|---|---|
| 2,081,237 A * | 5/1937 | Jantsch | |
| 2,162,159 A * | 6/1939 | Cole | 464/178 |
| 3,768,276 A | 10/1973 | Caldwell et al. | |
| 4,306,838 A | 12/1981 | Trainer | |
| 4,540,381 A | 9/1985 | Molloy et al. | |
| 4,589,855 A | 5/1986 | Ragaly | |
| 4,863,207 A * | 9/1989 | Wackerle et al. | |
| 5,051,071 A * | 9/1991 | Haentjens | 464/17 |
| 5,407,282 A * | 4/1995 | Bade et al. | 384/536 |
| 5,429,552 A | 7/1995 | Scherner et al. | |
| 5,606,890 A * | 3/1997 | Luckas | |
| 5,622,051 A | 4/1997 | Iida et al. | |
| 5,681,222 A | 10/1997 | Hansen et al. | |
| 5,803,811 A | 9/1998 | Fechter | |
| 5,807,179 A | 9/1998 | Hansen et al. | |
| 6,379,255 B1 * | 4/2002 | Cermak et al. | 464/179 |
| 7,670,229 B2 * | 3/2010 | Disser et al. | 464/179 |
| 2003/0236122 A1 * | 12/2003 | Blumke et al. | 464/178 |
| 2004/0152528 A1 * | 8/2004 | Okude et al. | 464/182 |
| 2007/0093304 A1 * | 4/2007 | Cermak | 464/179 |
| 2008/0293502 A1 * | 11/2008 | Oinuma et al. | 464/179 |

FOREIGN PATENT DOCUMENTS

GB 2405918 3/2005
JP 2003322247 11/2003

OTHER PUBLICATIONS

American Axle & Manufacturing, Inc., Part Print No. 40012370 dated Dec. 14, 1999.
American Axle & Manufacturing, Inc., Part Print No. 40037804 dated Sep. 22, 2004.
American Axle & Manufacturing, Inc., Part Print No. 40047604 dated Mar. 19, 2008.
American Axle & Manufacturing, Inc., Part Print No. 7839004 dated Nov. 11, 1980.

* cited by examiner

*Primary Examiner* — Gregory Binda
*Assistant Examiner* — Josh Skroupa
(74) *Attorney, Agent, or Firm* — Harness, Dickey & Pierce, P.L.C.

(57) ABSTRACT

A propshaft assembly that includes first and second shaft members, a joint, a center bearing assembly and a deflector. The joint couples the first and second shaft members to one another. The center bearing assembly includes a bearing that supports the joint. The deflector is coupled to the joint and shields an axial side of the bearing.

20 Claims, 4 Drawing Sheets

PROPSHAFT ASSEMBLY WITH CENTER BEARING SHIELD

FIELD

The present invention generally relates to a propshaft assembly with a center bearing shield.

BACKGROUND

This section provides background information related to the present disclosure which is not necessarily prior art.

Motorized vehicles traditionally include a power supply (e.g. an internal combustion engine, an electric motor and/or a combination thereof) that produces a drive torque. A transmission receives the drive torque and employs gear ratios to modify the input torque to obtain various desired output torques. The output torque is then transmitted through a propshaft assembly to a rear differential unit, which evenly distributes the torque between a pair of axle shafts. The axle shafts, in turn, cause movement of the vehicle through the vehicle wheels.

The propshaft assembly is subject to the stresses of the torque transmitting over its length. A center bearing assembly coupled to the vehicle's chassis assists in allowing rotation of and support for the propshaft assembly. However, the propshaft assembly and, specifically, the center bearing assembly are exposed to various contaminants, such as dirt, water, oil, salt, etc., due to their location at an undersurface of the vehicle. These contaminants can effect the bearing performance.

It would, therefore, be desirable to provide a propshaft assembly with protection from contaminants for the center bearing assembly.

SUMMARY

This section provides a general summary of some aspects of the present disclosure and is not a comprehensive listing or detailing of either the full scope of the disclosure or all of the features described therein.

In one form, the present teachings provide a propshaft assembly that includes a first shaft member, a second shaft member, a bearing assembly, a universal joint and a deflector. The first shaft member is configured to be coupled to a first power transmitting component. The second shaft member is configured to be coupled to a second power transmitting component. The bearing assembly has a support, which is configured to be coupled to a vehicle structure, and a bearing. The universal joint couples the first and second shaft members to one another. The universal joint has a joint structure that is received into the bearing such that the bearing supports the joint structure for rotation about an axis of the bearing. The deflector has an annular body portion that is mounted on the joint structure. The body portion extends radially outwardly from the joint structure and tapers axially toward the bearing assembly with increasing radial distance from the axis of the bearing. The body portion terminates at a radially outwardly edge that is disposed axially apart from the support by a predetermined gap distance. The deflector and the support cooperate to form a labyrinth that shields the bearing on a first axial side.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
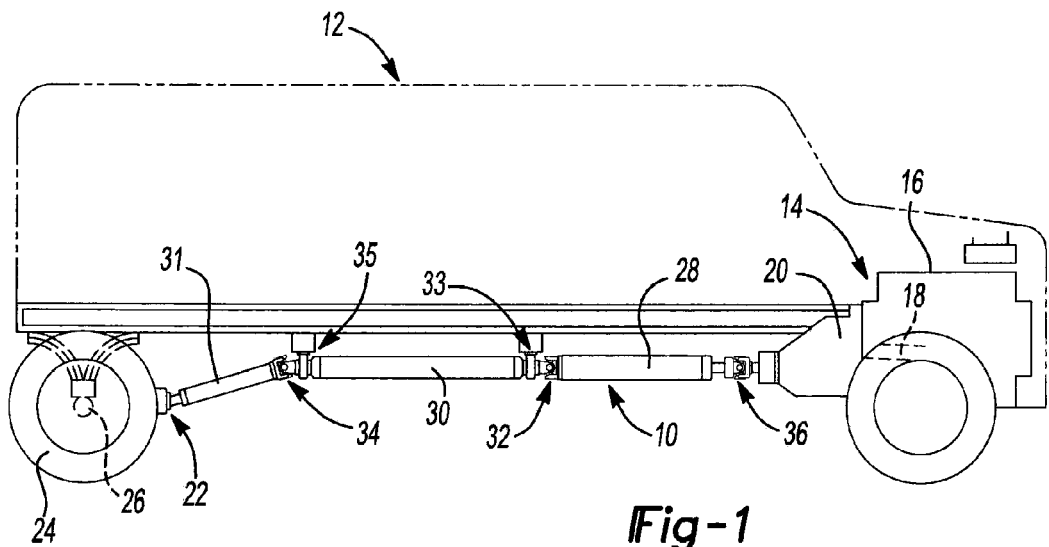
FIG. 1 is a schematic illustration of a motor vehicle with a propshaft assembly constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1 of the drawings, a propshaft assembly constructed in accordance with the teachings of the present invention is generally indicated by reference numeral 10. A motor vehicle 12 can include a powertrain 14 as part of the vehicle 12 with a longitudinally-mounted engine 16 rotatably driving a crankshaft 18 to provide rotary power to a transmission 20. The powertrain 14 can output rotary power to a rear axle assembly 22, via the propshaft assembly 10. The rear axle assembly 22 distributes the rotary power to a pair of vehicle wheels 24 (only one shown) via axle shafts 26 (only one shown) to propel the vehicle 12. It should be noted that while the rear-wheel drive vehicle 12 is illustrated, the teachings of the present disclosure are applicable to other vehicle arrangements, such as, for example, all-wheel drive vehicles. Additionally, the propshaft assembly 10 may receive the rotary power from any number of components other than the transmission 20, such as, for example, a torque transfer device, a power transfer unit or a transfer case.

Figure 2:
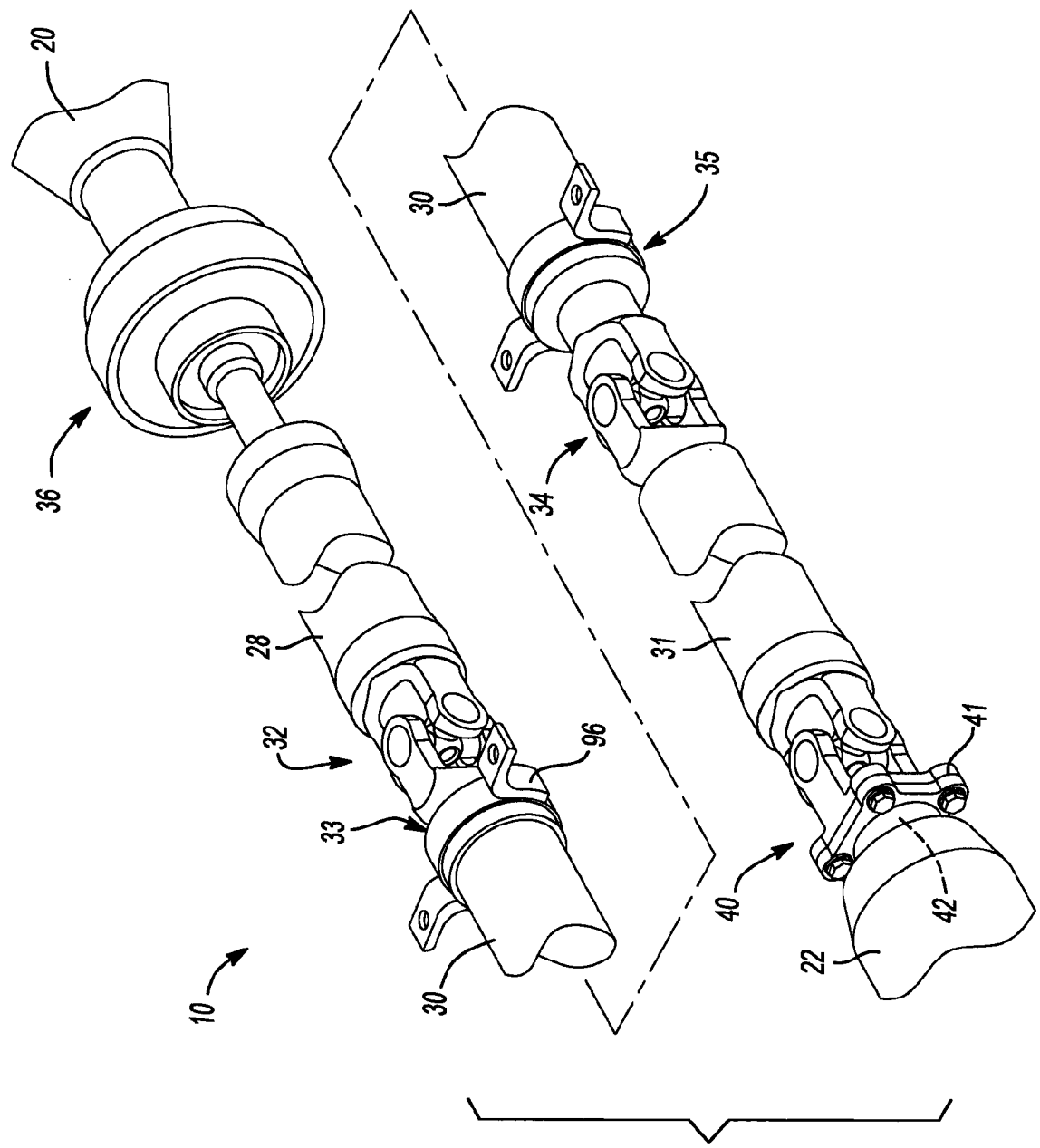
FIG. 2 is a perspective view of the propshaft assembly of FIG. 1.

Referring now to FIG. 2, the propshaft assembly 10 may include a first shaft member 28, a second shaft member 30, a third shaft member 31, a first joint 32, a first center bearing assembly 33, a second joint 34 and a second center bearing assembly 35. The first shaft member 28 can be coupled to an output of the transmission 20 in any desired manner, such as a joint 36 (e.g, universal joint or constant velocity joint). Likewise, a joint 40 (e.g, universal joint or constant velocity joint) can couple the third shaft member 31 to an input pinion 42 associated with the rear axle assembly 22 (FIG. 1) in any desired manner, such as via a flange connection 41.

Figure 3:
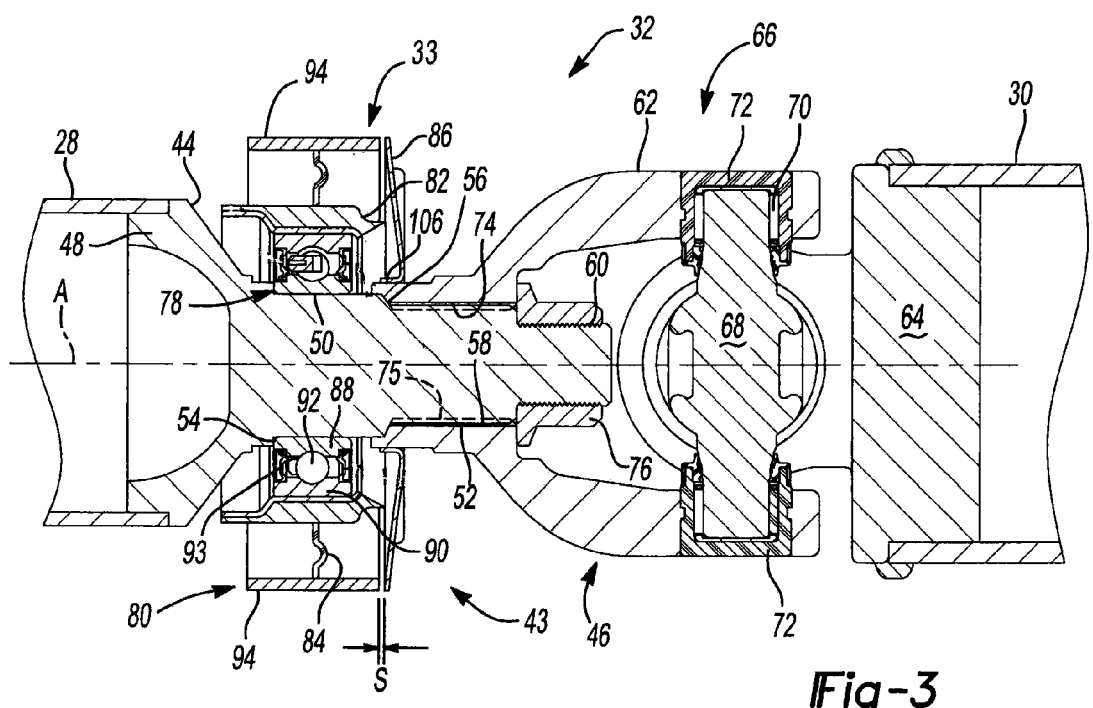
FIG. 3 is a cross-sectional view of a portion of the propshaft assembly of FIG. 1.

With reference now to FIG. 3, the first joint 32 can be any type of joint for rotatably coupling the first and second shaft members 28 and 30 to one another, such as a cardan joint, a constant velocity joint, a Hooke's joint, or a universal joint. For example, the first joint 32 can have a joint structure 43 that includes a stub shaft 44 and a cardan joint 46 for coupling the first and second shaft members 28 and 30 to one another. The stub shaft 44 can include a first coupling portion 48, an annular shaft portion 50, and a second coupling portion 52. The first coupling portion 48 can be fixedly coupled to the first shaft member 28. The shaft portion 50 can be disposed axially between the first and second coupling portions 48 and 52 and can include a first shoulder 54 and a second shoulder 56 between which a generally cylindrical body is disposed. The second coupling portion 52 can be configured to permit the cardan joint 46 to be removably coupled to the stub shaft 44. In the example provided, the second coupling portion 52 includes a splined shaft 58 and a threaded end 60.

The cardan joint 46 can include first and second yokes 62 and 64, respectively and a bearing assembly 66, which can include a conventional cross-shaped trunion or spider 68 and a plurality of bearing assemblies 70. The plurality of bearing assemblies 70 can be mounted on the ends of the spider 68 and received in corresponding holes 72 formed in the first and second yokes 62 and 64. The first and second yokes 62 and 64 can be coupled to the stub shaft 44 and the second shaft member 30, respectively. In this way, the spider 68 can be disposed between the first and second yokes 62 and 64 to transmit rotary power therebetween.

In the example provided, the first yoke 62 includes a female-splined aperture 74 that matingly engages a plurality of axially extending splines 75 of the splined shaft 58 of the second coupling portion 52. A nut 76 can be threadably engaged to the threaded end 60 of the stub shaft 44 to fixedly couple the first yoke 62 thereto.

It will be appreciated that the first coupling portion 48 of the stub shaft 44 and the second yoke 64 of the cardan joint 46 can be coupled to the first and second shaft members 28 and 30 in any desired manner, such as by welding. Moreover, it will be appreciated that if desired, the first joint 32 may be reversed relative to the first and second shaft members 28 and 30, such that the cardan joint 46 is directly coupled to the first shaft member 28 and the stub shaft 44 is directly coupled to the second shaft member 30.

The joint structure 43 of the first joint 32 can be received into the first center bearing assembly 33 so as to support the joint structure 43 for rotation about an axis A. In the example provided, the first center bearing assembly 33 can be configured to support the stub shaft 44 for rotation and can include a bearing 78, a support 80, a mounting bracket 82, a resilient mount 84, and a deflector 86. The bearing 78 can be a sealed bearing and can include an inner race 88, an outer race 90, and a plurality of bearing elements, such as bearing balls 92, between the inner and outer races 88 and 90, and seal structures 93. Each of the seal structures 93 can form a seal between the inner race 88 and the outer race 90 on an associated side of the bearing 78. The inner race 88 can be press-fit onto the shaft portion 50 of the stub shaft 44 and abutted against the first shoulder 54 so as to rotatably support the stub shaft 44.

The support 80 can include the mounting bracket 82, the resilient mount 84, an annular frame 94, which can be disposed concentrically about the bearing 78, and a pair of legs 96 (FIG. 2) that can extend outwardly from the frame 94. The legs 96 can be either directly or indirectly coupled to the vehicle 12 through any means known in the art, for example only, through fasteners (not shown) coupled to the vehicle's chassis (not shown).

The support 80 can be an annular structure that can be press-fit to the outer race 90 of the bearing 78. The resilient mount 84, which can be formed of a suitable elastomeric material, can be disposed between the annular frame 94 and the mounting bracket 82 to resiliently mount the bearing 78 to the support 80. In the particular example provided, the resilient mount 84 is a thermal plastic elastomer that is molded between and permanently bonded to the annular frame 94 and the mounting bracket 82.

Figure 4:
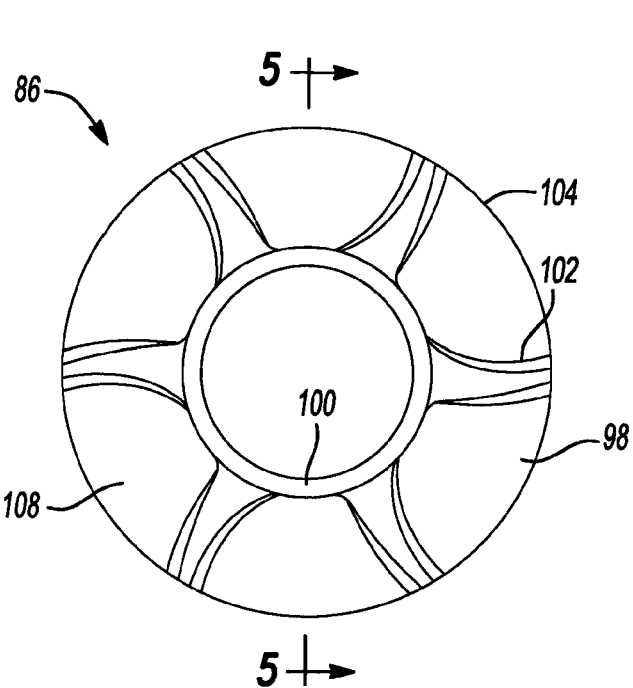
FIG. 4 is a front view of the center bearing shield of FIG. 3.
Figure 5:
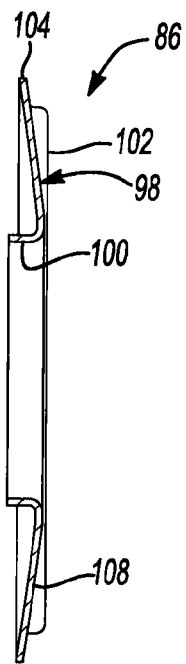
FIG. 5 is a sectional view of the center bearing shield taken through plane 5-5 in FIG. 4.

With reference to FIGS. 3-5, the deflector 86 may include an annular, frusto-conically shaped body portion 98, a collar portion 100, and a plurality of radially extending ribs 102. The collar portion 100 and the plurality of radially extending ribs 102 can be integrally formed with the annular body portion 98. The collar portion 100 can be mounted on the first yoke 62 and positioned proximate the bearing 78, such that a relatively small axial space S is disposed between the annular frame 94 of the support 80 and a radially outward edge 104 of the annular body portion 98. In the particular example provided, the collar portion 100 is said to engage a deflector mount surface 106 on the first yoke 62 in a press-fit manner. It will be appreciated that other coupling means can be employed for coupling the deflector 86 to the first yoke 62, including adhesives, solder, brazing, welding, and mechanical fasteners (e.g., screws, cups).

Figure 6:
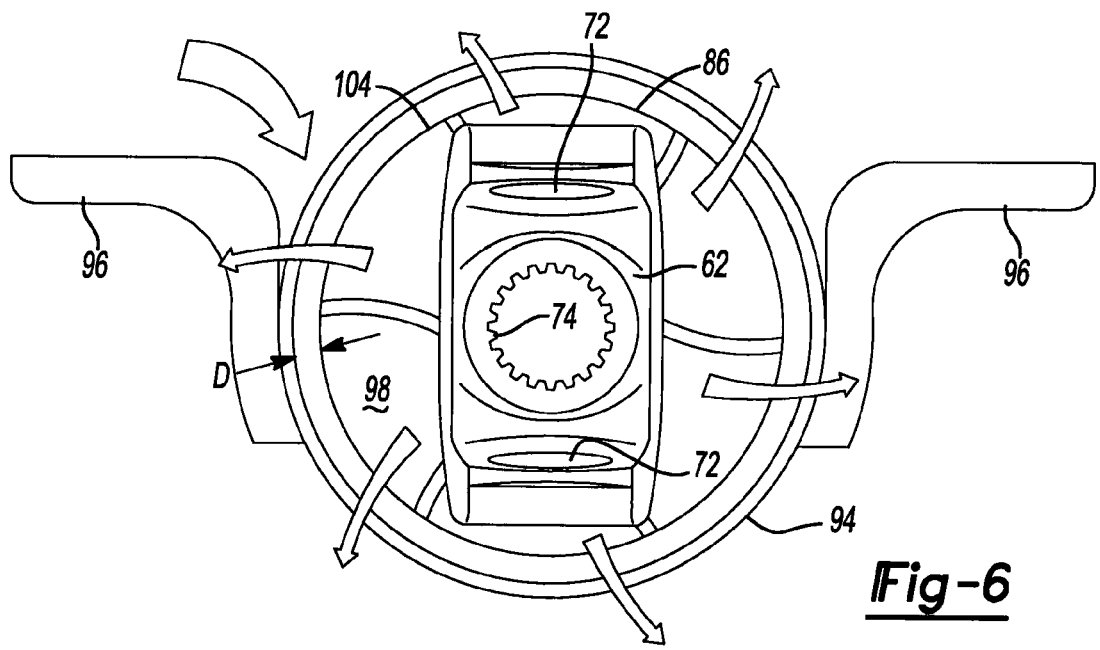
FIG. 6 is an enlarged view of a portion of the propshaft assembly of FIG. 1 showing a center bearing shield and a spline yoke in accordance with the teachings of the present disclosure.

The annular body portion 98 may extend radially outwardly from the deflector mount surface 106 of the first yoke 62 and taper axially toward the center bearing assembly 34 with increasing radial distance from the axis A. The radially extending ribs 102 may extend in a substantially arcuate shape from a side 108 of the annular body portion 98 opposite the center bearing assembly 34 so as to form vanes. The annular body portion 98 and the radially extending ribs 102 may terminate at the radially outward edge 104, so as to dispose the deflector 86 radially apart from the annular frame 94 by a predetermined gap distance D (FIG. 6).

The deflector 86 may cooperate with the support 80 to form a labyrinth for shielding an axial side of the bearing 78 from contaminants. The frusto-conical configuration of the deflector 86, along with the arcuate shape of the radially extending ribs 102 can drive contaminants flowing in towards the bearing 78 in a radially outward direction when the vehicle (FIG. 1) is driven in a forward direction. In this way, contaminants are forced away from the bearing 78 rather than accumulating at the interface between the bearing 78 and the shaft portion 50.

Figure 7:
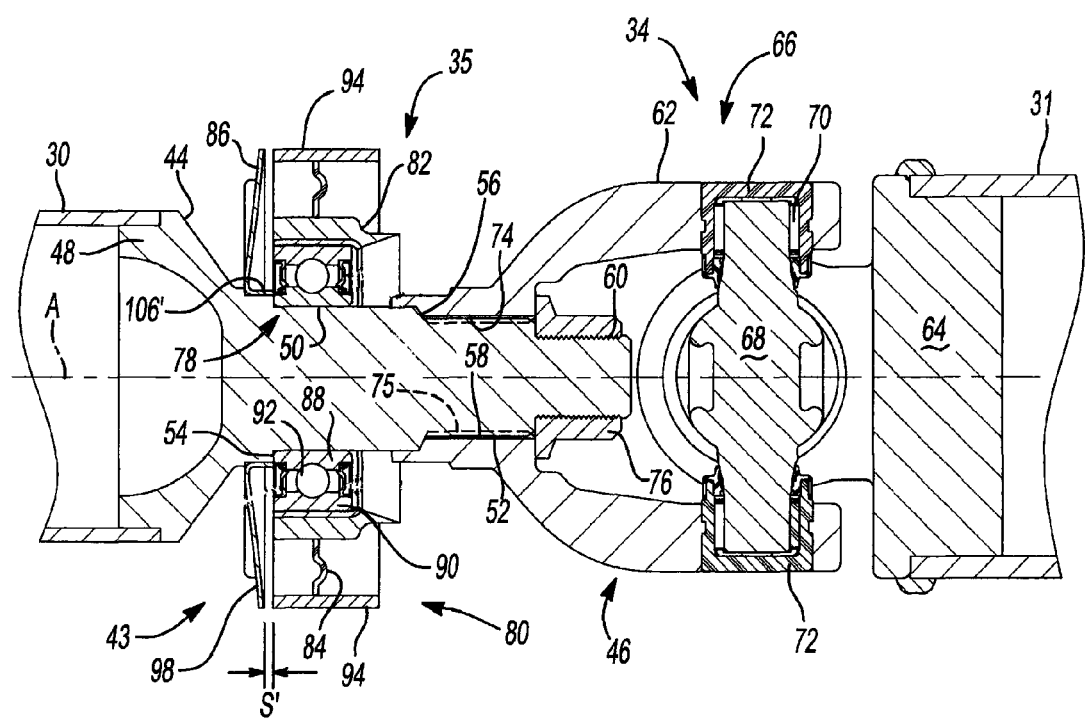
FIG. 7 is a cross-sectional view of another portion of the propshaft assembly of FIG. 1.

With reference to FIG. 7, the second joint 34 and the second center bearing assembly 35 can be generally similar to the first joint 32 (FIG. 3) and the first center bearing assembly 33 (FIG. 3) except as noted. Briefly, the second joint 34 can be any type of joint for rotatably coupling the second and third shaft members 30 and 31 to one another, such as a cardan joint, a constant velocity joint, a Hooke's joint, or a universal joint. In the example provided, the second joint 34 can be similar to the first joint 32 (FIG. 3) and can include a stub shaft 44, which can be coupled to the second shaft member 30, and a cardan joint 46 having first and second yokes 62 and 64, respectively and a bearing assembly 66 that can couple the third shaft member 31 to the stub shaft 44 in a manner that is similar to that which is described above and illustrated in FIG. 3 for the connection of the cardan joint 46 to the stub shaft 44.

The second center bearing assembly 35 can be configured to support the stub shaft 44 of the second joint 34 for rotation and can be generally similar to the first center bearing assembly 33 (e.g., it can include a bearing 78, a support 80, a mounting bracket 82, a resilient mount 84, and a deflector 86) except that the deflector 86 can be mounted on an annular portion 106' of the stub shaft 44 that forms the first shoulder 54.

With reference to FIGS. 4, 5 and 7, the annular body portion 98 of the deflector 86 can extend radially outwardly from the annular portion 106' of the stub shaft 44 and taper axially toward the center bearing assembly 35 with increasing radial distance from the axis A. The collar portion 100 can be mounted on a deflector surface of the annular portion 106' on the stub shaft 44 and positioned proximate the bearing 78 such that a relatively small axial space S' is disposed between the annular frame 94 of the support 80 and a radially outward edge 104 of the annular body portion 98. In the particular example provided, the collar 100 engages the deflector mount surface 106' in a press-fit manner. It will be appreciated that other coupling means can be employed for coupling the deflector 86 to the stub shaft 44, including adhesives, solder, brazing, welding, and mechanical fasteners (e.g., screws, cups).

The deflector 86 of the present disclosure can be effective as a shield that protects the bearing 78 from contact with dust, moisture, dirt, stones and other debris when the motor vehicle 12 (FIG. 1) is propelled in a predetermined direction (e.g., forwardly). Material impinging on the deflector 86 can be slung from the deflector 86 due to centrifugal force. It will be appreciated that the radially extending ribs 102 can stiffen the deflector 86 so that it is less susceptible to impact damage (e.g., from a stone). The deflector 86 of the present disclosure may be configured to generate a flow of air during rotation of the deflector 86 that could tend to deflect dust, dirt, stones and debris from impinging upon the deflector 86. Such air flow may also be employed to cool portions of the associated center bearing assembly (e.g., center bearing assembly 35). If desired, small holes may be formed into the annular body portion 98 proximate the root of the radially extending ribs 102 to permit air to be drawn through the deflector 86 from a side opposite the side 108.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A propshaft assembly comprising:
a first shaft member that is adapted to be coupled to a first power transmitting component;
a second shaft member that is adapted to be coupled to a second power transmitting component;
a bearing assembly having a support, which is adapted to be coupled to a vehicle structure, and a bearing;
a joint coupling the first and second shaft members to one another, the joint having a joint structure that is received into the bearing such that the bearing supports the joint structure for rotation about an axis of the bearing; and
a deflector having an annular body portion that is mounted on the joint structure, the body portion extending radially outwardly from the joint structure and tapering axially toward the bearing with increasing radial distance from the axis of the bearing, the body portion terminating at a radially outwardly edge that is disposed axially apart from the support by a predetermined gap distance, the deflector and the support cooperating to form a labyrinth that shields the bearing on a first axial side, wherein the deflector includes a plurality of radially extending, arcuate ribs that are formed on the body portion and extend from a side of the body portion opposite the bearing.

2. The propshaft assembly of claim 1, wherein the joint structure includes a stub shaft and a cardan joint, the stub shaft including a first shaft portion that is fixedly coupled to one of the first and second shaft members, the cardan joint being coupled to the other one of the first and second shaft members, the cardan joint having a spline yoke that is non-rotatably coupled to the stub shaft.

3. The propshaft assembly of claim 2, wherein the stub shaft includes a second shaft portion having a plurality of axially extending splines and wherein the spline yoke includes a female splined aperture into which the second shaft portion is received.

4. The propshaft assembly of claim 3, wherein a deflector mount is formed on the spline yoke and wherein the deflector is mounted on the deflector mount.

5. The propshaft assembly of claim 4, wherein the body portion of the deflector is press-fit to the deflector mount.

6. The propshaft assembly of claim 1, wherein the support includes a frame, which is disposed about the bearing, and a resilient mount that is disposed between the frame and the bearing.

7. The propshaft assembly of claim 6, wherein the support further comprises a pair of legs that are coupled to the frame.

8. The propshaft assembly of claim 1, wherein the bearing is a sealed bearing having seal structures, an inner bearing race and an outer bearing race, each of the seal structures forming a seal between the inner bearing race and the outer bearing race on an associated side of the bearing.

9. A propshaft assembly comprising:
a first shaft member that is adapted to be coupled to a first power transmitting component;
a second shaft member that is adapted to be coupled to a second power transmitting component;
a joint disposed between and rotatably coupling the first and second shaft members, the joint having a stub shaft and a cardan joint, the stub shaft including a first shaft portion that is fixedly coupled to the first shaft member, the cardan joint including a first yoke member, which is non-rotatably coupled to the stub shaft, and a second yoke member that is coupled to the first yoke member and non-rotatably coupled to the second shaft member;

a bearing assembly having a bearing, which is mounted on the stub shaft, and a support into which the bearing is received; and a deflector having an annular body portion and a plurality of ribs, the body portion being mounted on one of the stub shaft and the first yoke member and extending radially outwardly therefrom, the body portion having a frusto-conical shape, the ribs being integrally formed with the body portion and extending on a side of the body portion opposite the bearing, the deflector cooperating with the support to shield an axial side of the bearing.

10. The propshaft assembly of claim 9, wherein the bearing is a sealed bearing having seal structures, an inner bearing race and an outer bearing race, each of the seal structures forming a seal between the inner bearing race and the outer bearing race on an associated side of the bearing.

11. The propshaft assembly of claim 10, wherein the ribs have an arcuate shape.

12. The propshaft assembly of claim 11, wherein the stub shaft includes a first splined feature that is matingly engaged with a second splined feature on the first yoke member.

13. The propshaft assembly of claim 12, wherein the body portion of the deflector is press-fit to the one of the stub shaft and the first yoke member.

14. The propshaft assembly of claim 13, wherein the support includes a frame, which is disposed about the bearing, and a resilient mount that is disposed between the frame and the bearing.

15. The propshaft assembly of claim 14, wherein the support further comprises a pair of legs that are coupled to the frame.

16. A propshaft assembly comprising:

a first shaft member coupled to a first power transmitting component, the first shaft member having an extending stub shaft;

a second shaft member coupled to a second power transmitting member, the second shaft member having a yoke non-rotatably coupled to the stub shaft;

a bearing assembly having a bearing supporting the stub shaft for rotation about an axis of the bearing and a support coupled to a vehicle structure; and a deflector having an annular body portion including a plurality of radially extending, arcuate ribs extending from a side of the body portion opposite the bearing, wherein the deflector extends radially outwardly from the first shaft member and tapers axially toward the bearing assembly with increasing radial distance from the axis of the bearing, wherein a radially outward edge of the deflector is disposed axially and radially apart from the support by a predetermined gap distance, and wherein the arcuate ribs generate a flow of air during rotation of the stub shaft for cooling at least a portion of the bearing assembly.

17. The propshaft assembly of claim 16, wherein the stub shaft includes a first shaft portion and a second shaft portion, the first shaft portion being fixedly coupled to the first shaft member, the second shaft portion having a plurality of axially extending splines, the yoke having a female splined aperture into which the second shaft portion is received.

18. The propshaft assembly of claim 16, further comprising a plurality of holes formed in the annular body portion proximate a root of the radially extending ribs.

19. The propshaft assembly of claim 16, wherein the annular body portion includes a collar coupled to the first shaft member.

20. The propshaft assembly of claim 19, wherein the collar is coupled to the first shaft member through one of a press-fit, an adhesive, a solder, a braze, a weld, and a fastener.

* * * * *